United States Patent [19]

Weber

[11] Patent Number: 4,605,175
[45] Date of Patent: Aug. 12, 1986

[54] PRECISION COFFEE GRINDER

[75] Inventor: Robert L. Weber, New Canaan, Conn.

[73] Assignee: Webston, Inc., New Canaan, Conn.

[21] Appl. No.: 648,876

[22] Filed: Sep. 10, 1984

[51] Int. Cl.⁴ ............................................. B02C 19/12
[52] U.S. Cl. ....................................... 241/56; 241/66; 241/163; 241/261.1; 241/261.2
[58] Field of Search ...................... 241/55, 56, 57, 161, 241/162, 163, 261.1, 261.2, 261.3, 7, 8, 28, 29, 66; 426/518

[56] References Cited

U.S. PATENT DOCUMENTS

| | | | |
|---|---|---|---|
| 938,923 | 11/1909 | Walker | 241/161 X |
| 989,217 | 4/1911 | Wear | 241/161 X |
| 1,488,166 | 3/1924 | Pottratz | 241/161 X |
| 2,045,591 | 6/1936 | Falla | 241/161 X |
| 2,934,278 | 4/1960 | Roberson | 241/163 |

Primary Examiner—Mark Rosenbaum

[57] ABSTRACT

A coffee grinder grinds a predetermined amount of roasted coffee beans based upon the weight of the beans. The beans fall from a hopper into a grinding head which grinds the beans in a two-stage process. The first stage includes a cracking cutter, consisting of a cone cutter and a reel cutter, which reduces the beans to an initial particle size of approximately 1/16 of an inch in cross-section. The particles are then progressed by the grinding head, for the second stage of fine grinding, to an adjustable micro grinder consisting of two opposing rings having micro teeth on their inwardly facing surfaces. The cutters and grinder rings are mounted on thermally conductive metal hubs and a fan draws air around and behind the cutting teeth to cool them and avoid heating the coffee particles during the grinding process.

13 Claims, 6 Drawing Figures

PRECISION COFFEE GRINDER

BACKGROUND OF THE INVENTION

The present invention relates to coffee grinders and more particularly to such grinders which are used to grind roasted coffee beans in selected degrees of fineness.

At the present time, the advantages of freshly ground coffee are widely recognized, particularly in restaurants, cafes and other establishments. The advantages to the coffee roaster are that he may sell roasted beans in convenient containers, such as 5-lb. oxygen-barrier bags, and avoid the problems arising from in-plant grinding, such as environmental dust. He can also reduce packaging, warehousing and shipping costs.

Freshly ground coffee has numerous advantages to the restaurant. The brewed coffee, when made from freshly ground beans, has a superior aroma and taste compared to coffee brewed from previously ground beans. If the coffee has been pre-ground and packed, it is more likely to become stale and lose its flavor after the package has been opened. It is also inconvenient to utilize small pouches, such as the 2-3 oz. size, as they are subject to spillage and pilferage. In addition, it is considered by many restaurants to be more economical to grind the coffee themselves than to purchase ground coffee. Many restaurants want to advertise their coffee as being freshly ground and brewed.

There are a number of machines presently available for restaurants and other establishments which will grind a specified amount of coffee selected by the user. The coffee beans may be measured by their volume, by use of a timer, which may be inaccurate as to the final amount of ground coffee, due to the differences in density between batches of beans and other inaccuracies inherent in a timed system. In general, these machines consist of a rotatable disc cutter having extending blades which cut and grind the coffee beans between two rotatable discs in a one-stage grinding process. In many restaurants the coffee grinder may be used a number of times during the day, resulting in heavy usage and wear of the blades. The blades may be both time-consuming and expensive to replace or sharpen. In addition, the blades may give off an excessive amount of heat, damaging the coffee as it is being ground. In some cases the cutter may crush the beans instead of cutting them, which causes a build-up of heat, extraction of oils, and loss of flavor.

The presently commercially available machines produce a relatively uneven batch of ground coffee, that is, the particle size range may be relatively broad and, more importantly, the particle size is not uniform. The distribution of the sizes of particles may resemble, in statistical terms, a broad bell curve, so that many particles, at the right end of the imaginary particle size distribution curve, are large and their interiors not penetrated by the hot water. Much of the coffee flavor of such larger particles is unused and wasted.

It has been found, through the inventor's experimentation, that a greater amount of coffee may be brewed by using fine particles, which are of a uniform size, preferably, almost all of the particles (over 90%) are in the range of 200-300 microns in diameter and the particles are produced without crushing or pulverizing. It is believed that, under atmospheric pressure, the hot water from which the coffee is brewed penetrates each particle only a few cells deep from the surface, i.e., a layer of penetration of about 100-150 microns. A particle, which may be relatively large compared to the depth of hot water penetration, given up its coffee flavor only from a layer 3-5 cells thick on its surface. If a larger amount of surface area of the coffee bean can be exposed to the hot water, by decreasing the size of the particles and having uniformly sized particles, there will be an increase in the number of cups of coffee which can be successfully brewed from the same amount of roasted coffee beans. Presently, within the restaurant trade, it is considered that an acceptable amount of coffee to be produced from one pound of roasted beans is in the range of 55-75 cups, the lower end of the range providing stronger coffee.

OBJECTIVES AND FEATURES OF THE INVENTION

It is an objective of the present invention to provide a coffee grinder to grind roasted coffee beans which will grind the beans to a selected fineness having the greatest proportion of particles in the optimum size range so that its ground coffee will provide a relatively greater quantity of brewed liquid coffee and the brewed coffee will have a consistent strength from cup to cup, even though brewed from different batches of beans.

It is a further objective of the present invention to provide such a coffee grinder that will grind the coffee by cutting (slicing) and not by crushing or pulverizing; that such grinding will be temperature controlled, without heating or burning the coffee; that the grinding will be accomplished at an acceptable rate of speed; and that the ground coffee's particle size will be suitable for use in conventional water pour-over coffee brewers and urns.

It is a further objective of the present invention to provide such a coffee grinder that will be long-lasting and require little maintenance because it will be relatively sturdy, have few moving parts and its grinding head will have relatively long-lasting cutters.

It is a feature of the present invention to provide a grinder which is particularly adapted to grind roasted coffee beans, although with suitable modifications other materials, such as corn or nuts, may be ground. The grinder has a grinding head which is cooled by room temperature or refrigerated air so as not to overheat the ground particles, and which cuts and grinds the coffee beans in two separate stages.

A hopper means receives roasted whole coffee beans; for example, it may store 10-12 pounds of beans. The hopper leads to the entry port of a grinder assembly and the fully ground beans are expelled from its exit port. The grinder assembly has a motor having an output shaft, an air flow means, such as a fan mounted on the shaft; and grinding means to grind the beans. The exit port drops the ground coffee to a cup or bag mounted on a pivotable scale beam which is released to pivot and stop the grinder when the selected weight is attained on the scale.

The first stage of the grinder head means includes a cracking cutter having a cone-shaped member with blades and a rotatable reel cutter with blades driven by the motor shaft. The first stage, or cracking cutter, cuts the beans to particle sizes of about 1/16 inch and the second stage, or micro grinder, grinds those particles to a size range of 100-1500 microns, and preferably about 200-300 microns in diameter, depending upon the adjustment of the gap between the ring cutters. In the second stage a set of ring cutters has a rotatable ring with blades on its flat face, the ring being driven by the motor shaft. Preferably the ring cutters have one rotatable ring, and one fixed ring, with the rings having micro blades on their opposing flat faces.

It is a further feature of the invention that the grinder has a casing forming a fan chamber and vent holes so that the fan pulls air through the vent holes, over the grinder head and into the fan chamber. The shaft is hollow and air flows through its bore.

BRIEF DESCRIPTION OF THE DRAWINGS

Other objectives and features of the present invention will be apparent from the following detailed description of the invention taken in conjunction with the accompanying drawings.

In the drawings.

DETAILED DESCRIPTION OF THE INVENTION

Figure 1:
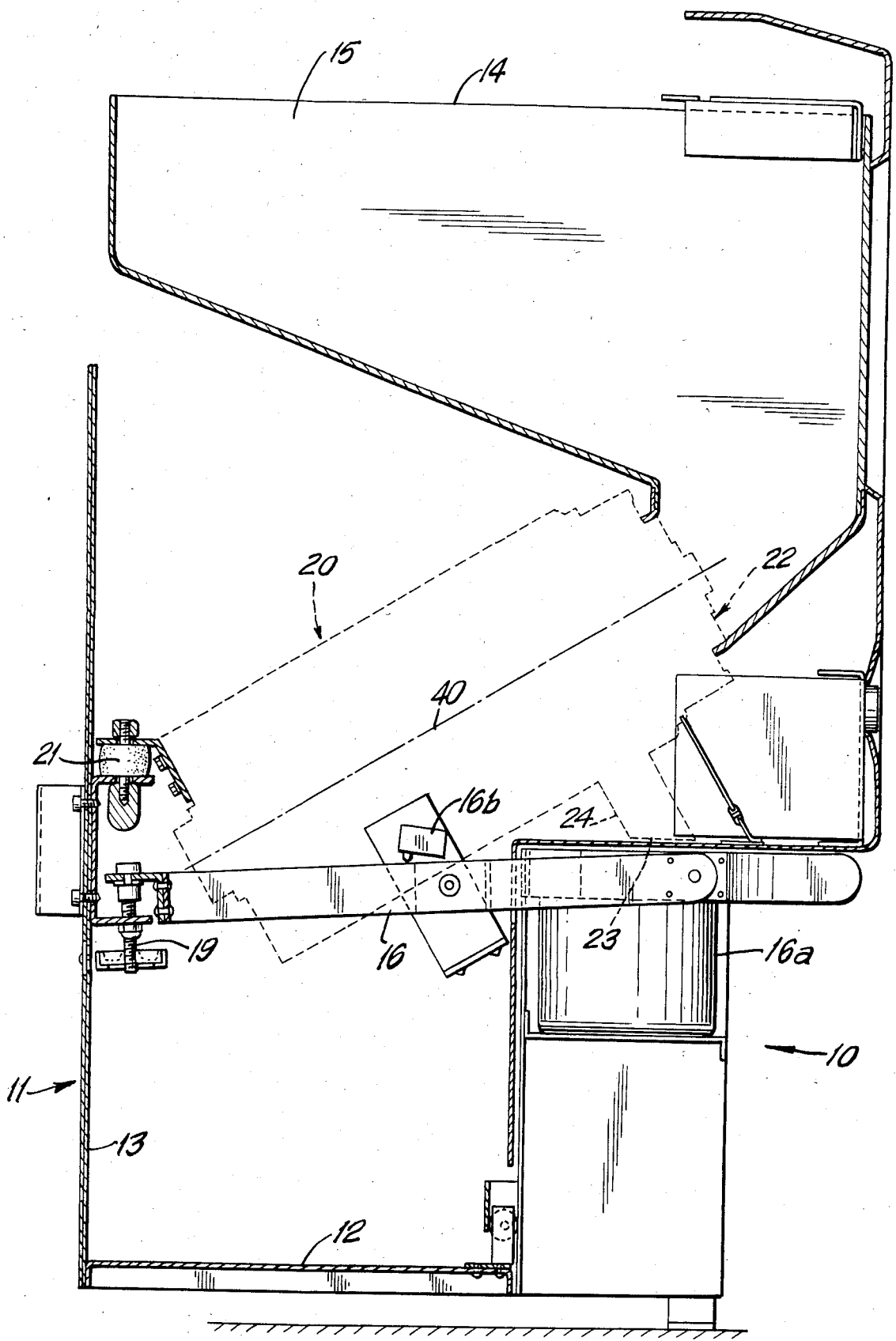
FIG. 1 is a side cross-sectional view of the coffee grinder of the present invention showing the location of the grinder assembly in outline form.

As shown in FIG. 1, the grinder 10 of the present invention is particularly described in connection with a coffee grinder, to grind coffee beans which have been roasted. But the grinder 10, with suitable modifications, may be utilized to grind grains, nuts, corn, and other materials.

The grinder 10 includes a sheet metal case 11 which preferably includes a base portion 12, four connected side walls 13 which form a rectangular case (in cross-section) and a top 14, opening into a hopper 15, which preferably holds 10–12 pounds of beans. The beans are ground and then automatically weighted. Preferably the scale 16 is of the type shown and claimed in the inventor's U.S. Pat. No. 3,796,349 entitled "Weighing Dispenser", incorporated by reference herein. The desired amount of coffee to be ground may be set by the screw setting 19, from 1-oz. to 1-lb. in fractional oz. increments. When the weight of the ground coffee on the cup 16a of scale 16 reachs the determined amount, the scale arm pivots and a switch 16b is operated and the grinder is turned off. Alternatively, the weight may be set by a user-operated dial. The quantity of ground coffee is accurately determined by weight and not volume.

The grinder assembly 20 is mounted to the case 11, and the bottom end and top ends by rubber vibration mountings 21. The imaginary axis 40 of the grinder assembly 20 is at an angle of 30° to the plane of the base portion 12. The beans are received at the entry port 22 (orifice) of the grinder assembly 20 and the ground coffee exits from the exit port 23 into an inclined conduit 24. The operator (user) need only push a button and the grinder will automatically grind the beans and deliver a weighed amount of ground coffee to the cup 16b placed beneath conduit 24.

Figure 2:
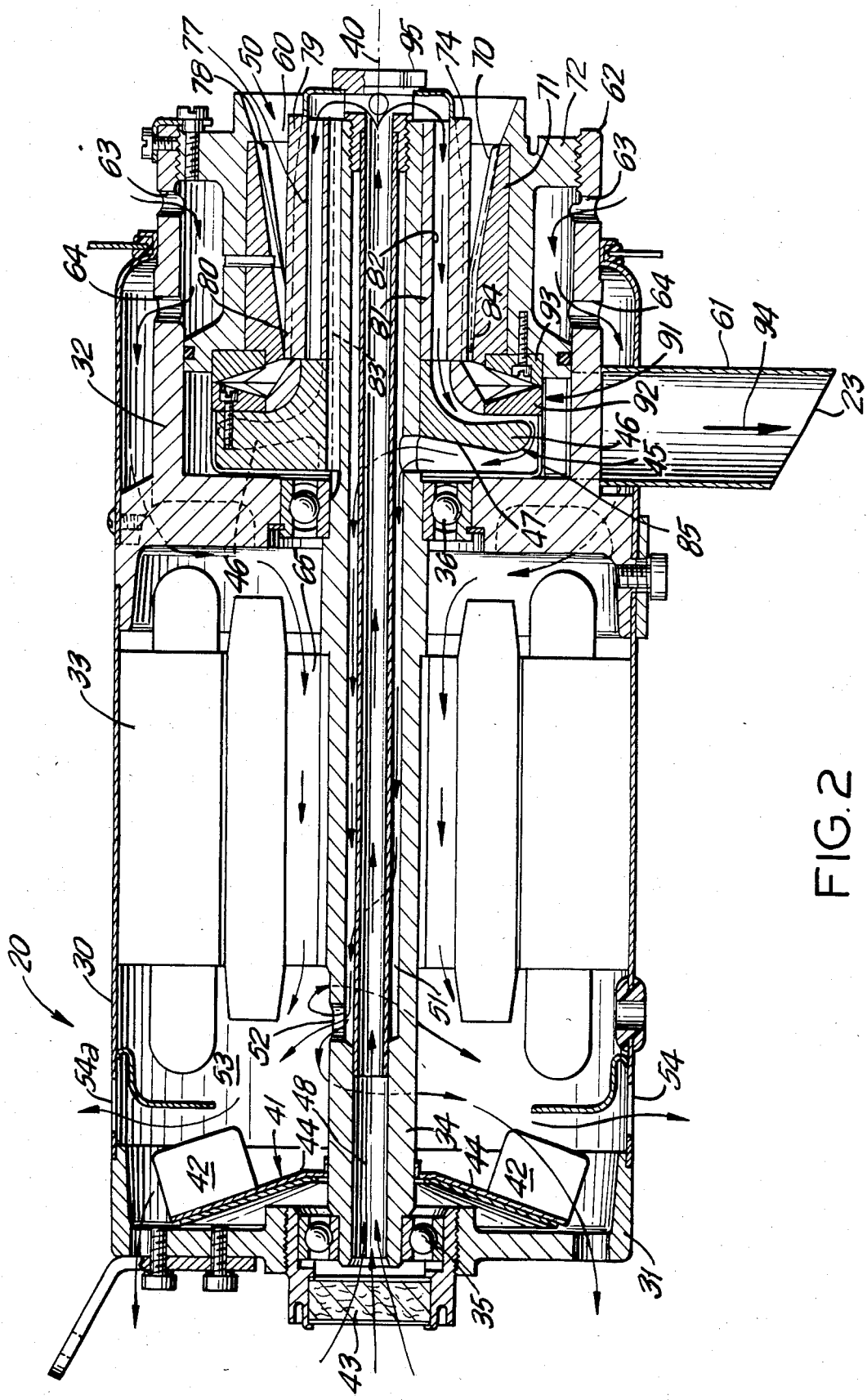
FIG. 2 is a side cross-sectional view of the grinder assembly.

As shown in FIG. 2, the grinder assembly 20 includes a casing 30, round in cross-section, which is connected to a bottom end plate 31 and to a top end support plate 32. A motor 33, which is attached to the casing 30 and inside the casing, drives a central hollow shaft 34. Preferably the motor is 115 volts A.C. and in the range $\frac{1}{2}$–$\frac{3}{4}$ H.P. The shaft 34 rotates in lower ball bearing 35, whose outer race (ring) is connected to plate 31 and top ball bearing 36, whose outer race (ring) is connected to support plate 32.

The shaft 34 rotates about the imaginary axis 40 and carries fan 41 consisting of plate 44 and paddles 42 which are fixed on the plate. For example, the plate 44 may have eight paddles. The rotation of the paddles 42, which are at an angle to the shaft axis 40, expels cooling air out through the air exit ports 54 and 54a.

A second fan 45 includes a fan block attached to the shaft 34 which has axially extending blades 46 fixed to a plate 47. The fan 45 pulls air through the end filter 43, through the inner hollow bore 48 of the shaft 45 and through the grinder head 50, described in detail below. The air pulled by the fan flows through the outer torus conduit 51 of the shaft 34. The air exits the shaft 34 through exit port 52 into chamber 53 and is pushed out of exit ports 54 and 54a of chamber 53 by fan 41.

The grinder head 50 grinds the coffee beans in two stages. The beans are first roughly ground in a cracking cutter consisting of a cone cutter and a reel cutter to a particle size of about 1/16 inch, and then finely ground in a micro grinder, consisting of a set of ring cutters, to a uniform particle size of about 240 microns. The beans are not crushed or pulverized, which would cause a loss of their oil and flavor. Both grinding stages are continuously air-cooled to help prevent the coffee shavings from being over-heated.

The roasted coffee beans enter the grinder head 50 through intake orifice 60 and exit, as finely ground coffee, from exit tube 61 which leads to orifice 23.

The grinder head 50 includes the bushing portion 62 of the support plate 32 which has a series of air vent holes 63. Air enters into the casing by being pulled in through vent holes 63 and out through vent holes 64 in bushing portion 62. The air then flows through openings 65 in the motor and into chamber 53. The air, as explained above, is pulled into chamber 53 by the fan 41 and is expelled from the chamber 53 by the same fan.

The cracking cutter 70 cracks the coffee beans and shaves them to an optimum particle size and consists of a fixed cone cutter and a rotatable reel cutter. The blades of the cone cutter cooperate with the blades of the reel cutter and progress (move) the shavings to the ring cutters in the micro grinder. The shavings, which are preferably about 1/16 inch in cross-section and in the range of 1/32 to 3/32 inch, are ground into particles which are predominantly (over 90%) 100–1500 microns in cross-section and preferably 200–300 microns.

The cracking cutter 70 includes an outer torical fixed cone cutter 71 which is fixed to bushing support member 72. The fixed cone cutter 71 is machined from hard and durable material such as heat-treated steel, as are the other blade members. It is mounted on the bushing support member 72 which is of a thermal conductive metal, preferably aluminum. The support member 72 is attached, by screw threads, to fixed bushing portion 62.

Figure 4:
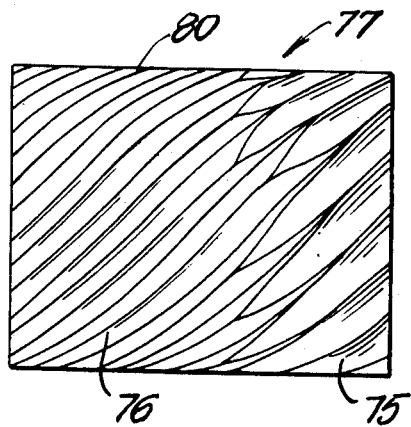
FIG. 4 is a side view of the reel cutter.

The cracking mill consists of the fixed cone cutter 71 and the rotary reel cutter 77 having external spiral helical blades 75 and 76, as shown in FIG. 4.

Figure 3:
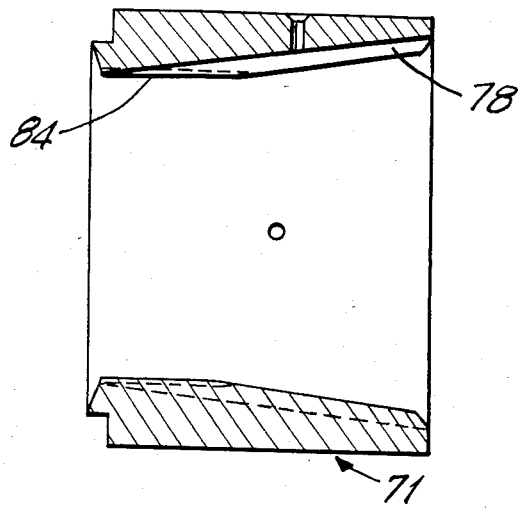
FIG. 3 is a side cross-sectional view of the fixed cone cutter.

As shown in FIGS. 2 and 3, fixed cone cutter 71, which is a toroidal member, has tapered blade teeth which are wider at its entry orifice and tapered inwardly towards the imaginary axis 40. The fixed teeth cooperate with the teeth of the reel cutter 77, see FIG. 4. The upper portion of the reel cutter 74, which is the rotary member of the cracking mill, has broader blade teeth 75 and the lower portion 80 has finer spirally formed teeth 76, preferably a 45° helix.

Figure 5:
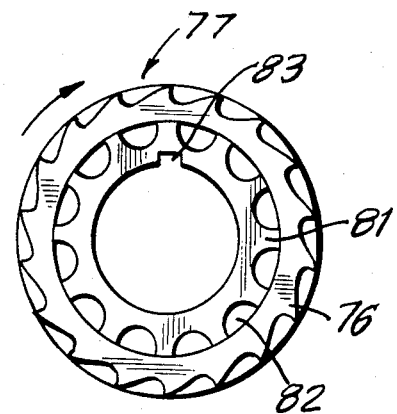
FIG. 5 is an end view of the reel cutter mounted on its hub.

As shown in FIGS. 2 and 5, the reel cutter 77, of a hard metal, is mounted on a hub 81 of a thermally conductive material, such as aluminum. The hub 81 has a series of elongated bores 82 therethrough to allow the passing of cooling air through the hub. The hub 81 is mounted by the keyway 83 on the shaft 34 so that the hub 81 and the reel cutter 77 turn with the shaft 34. The cone member, shown in FIG. 3, has fixed teeth which cooperate with the teeth of the reel cutter 77 to form the cracking mill, i.e., the cracking mill consists of fixed teeth 84 and rotatable teeth 75,76.

Figure 6:
FIG. 6 is a side plan view of one of the rings of the micro grinder.

As shown in FIGS. 2 and 6, the particles of beans which are cut from the beans by the cone cutter and reel cutter are fed to the micro grinder 91. The micro grinder 91 consists of two flat ring members 92 and 93. The flat faces of the ring members 92 and 93 have micro teeth and the rings are closely, but adjustably, spaced together.

The ring member 92 is rotatable because it is attached to the fan 45 and rotates with the shaft 34. The ring member 93 is fixed (non-rotatable) as it is attached to the support member 72, see FIG. 2. The air from the bore 48 is constrained from leaving the grinding assembly by the cap 95, which directs the air into the holes 82.

The air which is pulled through the holes 82 cools the reel cutter 77 and then passes around, and cools, the ring cutter 92. The air passes around the ends of the fan plate 47 and within the metal cowling 85, which rotates with shaft 34, and into the conduit 51 of the shaft 34. The ground coffee exits from the micro grinder 91 in the direction of the arrow 94.

Modifications may be made in the present invention within the scope of the subjoined claims. For example, in the micro grinder both rings may be rotatable, but in different directions. As another example, the cone cutter may have a straight right cylindrical section (a tubular section) in addition to its cone-shaped section, having blades which cooperate with the blades of the reel cutter.

What is claimed is:

1. A grinder for grinding roasted coffee beans without heating the beans, including:
   hopper means for holding a quantity of beans;
   a grinder assembly having an entry port to receive the beans, an exit port to expel the ground beans, a motor having an output shaft, grinder head means to grind the beans, and air flow means to flow air through the grinder head means;
   wherein the grinder head means grinds the beans in two stages, said first stage including a cracking cutter means positioned at said entry port to cut the beans into shavings and having a fixed member and a rotatable member rotatably driven by said shaft, one of said members being a cone having blades thereon and the other being a right cylindrical reel having blades thereon;
   said second stage including a micro grinder means to finely grind the shavings received from the first stage and having at least one rotatable ring with blades on its flat face which is rotatably driven by said shaft, said micro grinder means receiving cut bean shavings from said first stage and delivering ground coffee selected to be in the size range 100–1500 microns to said exit port, wherein the predominant over 80% particle size is within 50 microns of the size selected;
   and wherein said micro grinder comprises two rings each being ring-shaped with a flat face thereon and having blades on said flat face, the blades facing each other and being spaced apart, and one ring being rotatable and the other ring being fixed.

2. A grinder as in claim 1 and further including scale means to weigh a selected weight of the ground beans received from the exit port.

3. A grinder as in claim 2 wherein said scale means includes a pivotable scale platform to hold the ground beans and means to release the scale platform when the selected weight is reached.

4. A grinder as in claim 1 wherein said air flow means includes a rotatable fan mounted on said shaft.

5. A grinder as in claim 4 wherein said shaft is hollow to form a central bore and said air flow at least partly flows through said bore.

6. A grinder as in claim 5 and including a second fan mounted on said shaft, said second fan including a plate member whose plane is perpendicular to the axis of said shaft, and blade members extending from said plate member parallel to said axis.

7. A grinder as in claim 6 wherein said blades are of a hard metal and the blades are mounted on a softer thermal conductive metal.

8. A grinder as in claim 1 wherein said reel cutter is a rotatable toroidal reel with external blades which reel is driven by said shaft.

9. A grinder as in claim 8 wherein the blades of the reel are in a spiral helical form.

10. A grinder as in claim 8 wherein rotatable members of said cracking cutter and micro grinder are directly fixed to said shaft.

11. A grinder as in claim 1 wherein the blades of the micro grinder extend adjustably from the face of the ring to form a gap in the range 100–1500 microns.

12. A grinder for grinding roasted coffee beans without significantly heating the materials, including
   hopper means for holding a quantity of beans;
   a grinder assembly having an entry port to receive the beans, an exit port to expel the ground beans, a motor having an output shaft, a grinder head to grind the beans, and a fan fixed to said shaft to flow air over the grinder head;
   wherein the grinder head grinds the beans in two stages, said first stage being a cracking cutter including a cone cutter and a right cylindrical reel cutter positioned at said entry port, the cone cutter being a fixed cone having blades thereon;
   said reel cutter being a rotatable toroidal reel with external blades which reel is driven by said shaft;
   said second stage including a micro grinder to finely grind the shavings received from the cracking cutter and having a first rotatable ring with blades on its flat face which is rotatably driven by said shaft and a second ring with blades on its flat face facing said first ring, said micro grinder receiving cut bean shavings from said first stage and delivering ground coffee whose predominant particle size is in the range 100–1500 microns to said exit port.

13. A grinder as in claim 12 and further including scale means to weigh a selected weight of the ground beans received from the exit port, said scale means including a pivotable scale beam which pivots when the selected weight is reached.

* * * * *